United States Patent Office 3,200,002
Patented Aug. 10, 1965

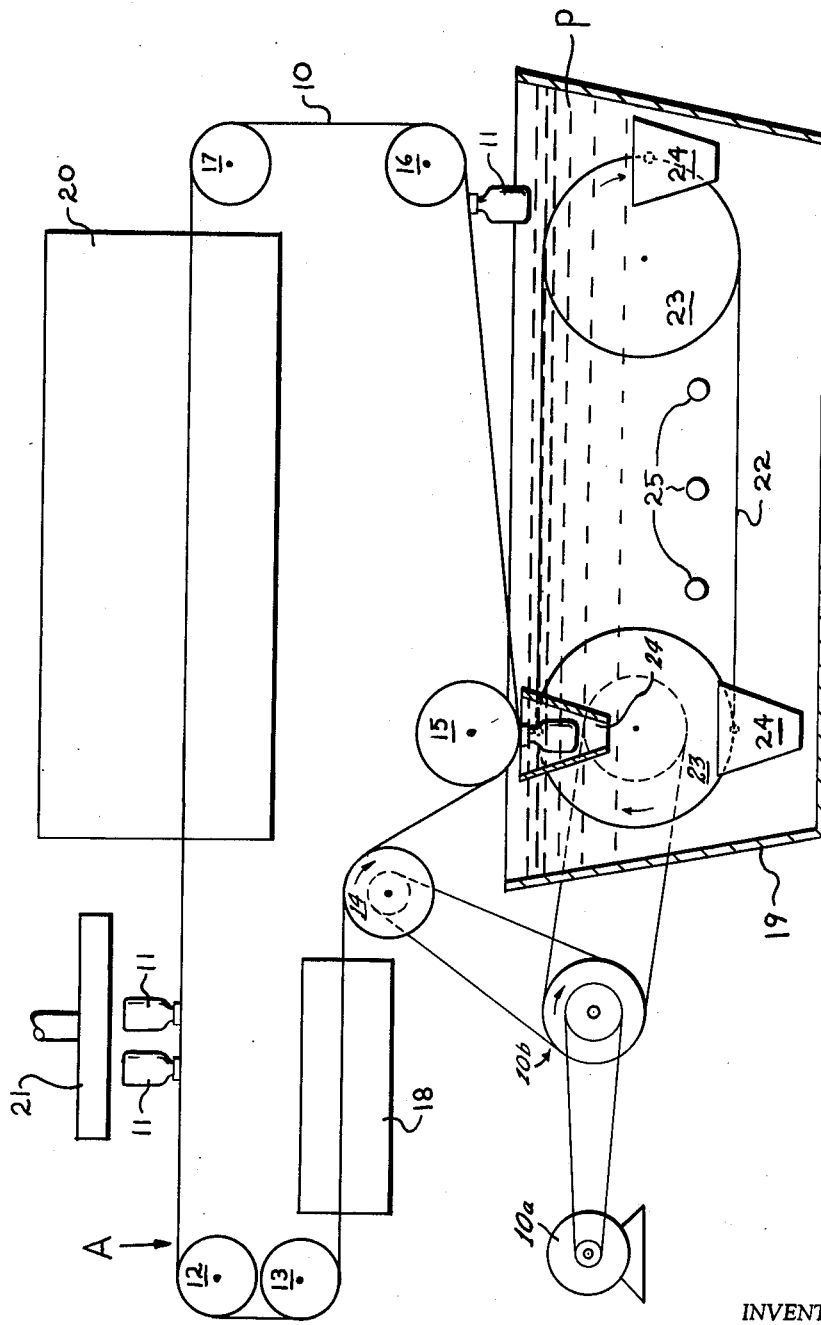

3,200,002
METHOD AND APPARATUS FOR DIPPING GLASS ARTICLES IN LIQUID PLASTIC
Kenneth G. Lusher, Perrysburg, Ohio, assignor to Owens-Illinois Glass Company, a corporation of Ohio
Filed June 14, 1962, Ser. No. 202,473
5 Claims. (Cl. 117—54)

This invention relates generally to the manufacture of plastic coated glass articles and more particularly to a method and apparatus for dipping the article to be coated in a tank containing the coating material.

The desirability of plastic coated glass articles for use as "aerosol" containers is gaining widespread recognition. In aerosol containers the contents are placed therein and sealed under a positive pressure. The sealing is effected by a valve which also serves to dispense the desired quantities of the material therein contained. The use of glass for such type containers is especially desirable when the material to be contained requires that it possess chemically inert properties to resist chemical contamination or reaction with the content. However, inasmuch as glass is extremely fragile, it was recognized that it would be too hazardous to subject it to the high internal pressures of aerosol type containers unless some provision were made for strengthening it. As a result, there was developed the process of applying a plastic coating to the outside of such glass aerosol containers.

Naturally, in order for such type of containers to have the necessary sales appeal, it is essential that the plastic material be applied evenly and smoothly in order to present an attractive package. One known method of applying plastic coating to a glass article involves attaching the glass article to a continuously moving chain or conveyor. While moving along with such conveyor and in an upright position, it is given a preheat treatment and almost immediately dipped into a tank containing the plastic in flowable form. As the glass article moves through such liquid, it will, if the liquid is not moving, set up waves which result in the finished article having a rough and uneven coating. Such article, in addition to lacking the required attractiveness, may also present a hazard if an area thereof has an excessively thin coating or, on the other hand, it may result in a waste of plastic material if the coating is too thick.

Accordingly, it is an object of this invention to provide a method and apparatus for applying plastic coatings to continuously moving glass articles yet do so in such manner that the resulting article will have a smooth, evenly distributed coating.

The desirability of a smooth and even coating of plastic material for such articles has been recognized and there have been attempts to solve the problem. One such attempt which has reduced, but not eliminated the problem, has been to provide a double bottom tank in which the liquid plastic is placed. The liquid plastic flows through the upper portion of such tank in the same direction and at approximately the same velocity as the glass article to be coated. Upon reaching the end of the tank, after the glass article has been removed, the liquid plastic flows down to the lower portion of the tank, through the lower portion to the front of said tank, and back up to the upper portion. In this manner the plastic material is maintained in continuous circulation for successive dippings. The problem with this method, however, is that because of frictional forces at the tank side walls, the velocity of the liquid plastic is not uniform throughout, but rather varies from zero at the sides to a maximum at the center. As a result, a certain amount of unevenness is still present in plastic coatings applied by this method.

Another disadvantage of the just-mentioned method lies in the fact that proper conditioning of the liquid plastic is essential in order to produce commercially acceptable coatings. The liquid plastic is particularly susceptible to the entrapment of air bubbles which, if present, will appear on the surface of the coated article. The agitation resulting from the continuous circulation of the liquid plastic has the effect of greatly increasing the entrapment of air bubbles therein.

One of the great problems in coating is caused by the fact that the glass article and the liquid plastic to be coated thereon must be at optimum temperatures and the optimum temperature of the glass article is different from that of the liquid plastic. Thus, the plastic should be at approximately 85° F. during the dipping operation. However, the glass article to be coated must travel through a preheating oven to be heated to a temperature approaching 250° F. immediately before dipping in the liquid plastic. Obviously, successive dippings of articles approaching 250° will have the effect of raising the temperatures of the liquid plastic considerably higher than 85° F. unless means are provided to control the temperature of such plastic.

Therefore, it is a further object of this invention to provide a relatively simple method for applying plastic coatings to glass articles wherein the liquid plastic which is presented at the beginning of the cycle is substantially constant temperature and wherein there is virtually no movement of such liquid plastic in relation to the moving glass article.

Another object of this invention is to provide a static dipping operation in conjunction with a continuously moving conveyor.

An additional object of this invention is the provision of a process for coating glass articles with a plastic in a continuous, rapid, and economical manner such that the articles are smoothly and accurately coated to produce an attractive package.

The above objects, as well as other objects and advantages of this invention, will become apparent to those skilled in the art from the following detailed description, taken in conjunction with the annexed sheet of drawings on which there is presented, for purposes of illustration only, a preferred embodiment of the invention.

The figure shown is a schematic elevational view, partly in section showing the layout for a typical coating system and showing the dipping system embodying this invention enlarged for a clearer representation.

There is shown in the figure an endless conveyor chain 10 which serves to transport the articles to be coated through the coating cycle. For the purposes of this description, the articles to be coated are shown as bottles 11. Although only a few bottles 11 have been shown on the drawing, it should be understood that they are closely spaced around the periphery of the chain in order to obtain maximum production. Any preferred means may be used for securing the bottles 11 to the chain 10 during the coating process. One such means is set out in detail in U.S. Patent 2,882,061 which is assigned to the assignee of this invention. A fixed path for the conveyor chain 10 is provided by vertically aligned sprockets 12, 13, 14, 15, 16, 17, strategically located on the machine and about which the chains are reeved for running engagement on the teeth of the sprockets as will be described presently. Any desired means, such as a motor 10a and power train 10b, may be used to power movement of the conveyor.

Beginning at the left-hand side of the figure, there is shown a loading zone A at which the bottles 11 are loaded on the conveyor chain 10 in an inverted position. Between the sprockets 13 and 14, in an area where the bottles are traveling substantially horizontally in an upright position, there is provided a preheat oven 18 which serves to heat the bottles 11 to the optimum dipping temperature. There is also provided a plastisol dipping tank 19, the details of which will be described presently, having liquid plastic P contained therein. A fusing oven 20 and a cooling head 21 complete the cycle of basic equipment used in a typical plastisol dipping process.

In the operation of a typical plastisol dipping process the bottles 11 which are to be coated are loaded on the chain 10 at the loading zone A. They may then be carried by the chain 10 in a counterclockwise direction, around sprockets 12 and 13 so that they are changed from an inverted to an upright position. After traveling around the sprocket 13, the bottles 11 travel through the preheat oven 18 which serves to heat the bottles from room temperature of approximately 72° F. to the optimum temperature for dipping, approximately 250° F. After leaving the preheat oven 18, the bottles travel around sprockets 14 and 15 which are positioned to effect the lowering of said bottles into the tank 19 such that all but the tops of the neck portions are submerged in the plastic P. The bottles travel through the tank 19 toward the next sprocket 16 which is at the opposite end of the dipping tank 19 from, and slightly above, the sprocket 15. Thus, as the bottles 11 travel from sprocket 15 to sprocket 16, they are gradually raised out of the plastic P contained in the tank 19. After leaving the tank 19, the bottles travel around sprockets 16 and 17 to an inverted position for travel through the oven 20 where the coated bottles are heated to form a fused coating. After passing through the fusing oven 20 the plastic coated bottles are cooled to handling temperature by travelling under the cooling head 21. They then continue to the loading zone A where they are removed.

As previously noted, it is necessary, in order to achieve a smooth coating on the bottles 11, that there be little or no relative movement between the bottles 11 and the liquid plastic D during the dipping process. However, it is quite obvious if the bottles 11 are moving during their travel through the dipping tank 19, there will be relative movement between such bottles and such liquid plastic unless means are provided to move the liquid plastic with the bottles. Such means will now be described.

There is provided in the tank 19 an endless chain 22 which is reeved around a pair of sprockets 23. The sprockets 23 are rotated in a clockwise direction by any preferred means such as the power train 10b in such manner that the upper portion of the chain 22 travels in the same direction and at the same speed as the chain 10 and bottles 11. A series of endless sleeves 24 are secured to the chain 22. Although only a few sleeves have been shown, it should be understood that the sleeves are spaced apart substantially the same distance as are the bottles 11 on the conveyor chain 10 in order that as each bottle 11 is lowered into the liquid plastic P, it will be met by a sleeve 24 which is raised around it and which travels thorugh the tank 19 with it. The sleeves may be pivotally mounted on the chain so that their respective central axes remain vertical throughout travel around chain 22. There are also provided a series of cooling pipes 25 through which cooling fluid passes in order to maintain the liquid plastic P at the optimum temperature of 85° F. Any preferred means may be used to replenish the liquid plastic in the tank to maintain such plastic at a constant level.

In the operation of this invention, an endless sleeve 24 is raised around each bottle 11 as such bottle is dipped into the liquid plastic. Inasmuch as the sleeve 24 and the bottle 11 travel at the same velocity, the liquid plastic entrapped in such sleeve is substantially motionless relative to the bottle. By the time the bottle 11 and the sleeve 24 reach the end of the dipping tank 19, the bottle 11 has been raised out of the plastic. As the sleeve 24 travels around the sprocket 23, it is lowered into the liquid plastic so that it is completely submerged therein. Inasmuch as the sleeve 24 is endless and its axis remains vertical, liquid plastic passes through it during its downward movement to thereby cause the liquid plastic that was trapped therein when the bottle 11 was being coated to become mixed with the larger quantity of plastic in the tank 19. By thus lowering and then raising the sleeves during their travel through the dipping tank 19, it is possible to continuously supply fresh plastic at the optimum dipping temperature to the bottles 11 to be coated.

Movement of the sleeves 24 through the liquid plastic P serves the additional function of continuously mixing said plastic to thereby cause those portions of the plastic which have been heated by the bottles to become sufficiently intermixed with the rest of the supply to insure a constant temperature of plastic at the beginning of the dipping cycle for each bottle.

It may be easily seen from reviewing the disclosure of this invention that there is provided a novel and efficient method of continuously dipping glass bottles in liquid plastic in such manner that there is no relative movement between the liquid plastic and the bottle to be coated. Further, each bottle to be coated receives a fresh supply of liquid plastic which has been conditioned to optimum temperatures. By coating in this manner the resulting finished article produced therefrom has the necessary qualities of beauty and good workmanship to be appealing to the consumer.

It is obvious that numerous modifications will become readily apparent to those skilled in the art. It is not the purpose to limit the scope of the patent granted hereon otherwise than as necessitated by the scope of the appended claims.

I claim:

1. The method of applying plastic coating to an article comprising the steps of heating said article, dipping said heated article into a body of relatively cooler liquified plastic material, moving said article through said bath of plastic material while maintaining the portion of liquified plastic material in the vicinity of said article in a quiescent condition relative thereto, and maintaining communication between said quiescent plastic material and said body of plastic material to thereby retard heating of said quiescent plastic material.

2. Apparatus for applying plastic coating to glass articles comprising a tank for containing a quantity of plastic in liquid form, conveyor means for immersing and continuously moving said glass article through said plastic, a plurality of open-ended sleeves, means for encircling one of said sleeves around a glass article upon the immersion of said article in the plastic, and means for moving said sleeves through said plastic at substantially the same speed as said conveyor so that the portion of plastic material in the vicinity of each of the glass articles is substantially static relative to said glass article.

3. Apparatus for applying plastic coating to glass articles comprising a tank for containing a quantity of plastic in liquid form, conveyor means for immersing and continuously moving said glass articles through said plastic, a plurality of open-ended sleeves, means for encircling one of said sleeves around a glass article upon the immersion of said article in the plastic, means for moving said sleeves through said plastic at substantially the same speed as said conveyor so that the portion of plastic material in the vicinity of each of the glass articles is substantially static relative to said glass article, and means for causing the portion of plastic entrapped in said sleeve with the glass article to flow through said sleeve upon removal of said glass article to thereby become mixed with the rest of said quantity of plastic.

4. Apparatus for applying plastic coating to glass articles comprising a tank for containing a quantity of plastic in liquid form, conveyor means for immersing and continuously moving said glass article through said plastic, a plurality of open-ended sleeves, a second conveyor means for moving said sleeves in said tank so that a sleeve will encircle each article while the same is moving through the plastic to maintain the plastic in the vicinity of said articles in static condition relative thereto, said second conveyor means adapted to move each of said sleeves in the direction of its longitudinal axis upon removal of the glass article therefrom to cause the plastic entrapped in the sleeves to flow therethrough and become mixed with the main body of plastic.

5. Apparatus for coating glass articles with plastic material comprising means for heating said articles, means for dipping said articles into a body of relatively cooler liquified plastic material, means for successively positioning an open-ended sleeve around each of said glass articles concurrently with said dipping, means for moving said sleeve and said article positioned therein through said plastic so that the plastic in the vicinity of each of said articles remains substantially motionless relative thereto, means for removing said articles from said plastic, said sleeves in their movement successively mixing the plastic entrapped therein with the main body of plastic, and means for cooling said body of plastic.

References Cited by the Examiner
UNITED STATES PATENTS

| | | | |
|---|---|---|---|
| 968,791 | 8/10 | Olson | 53—167 |
| 1,967,856 | 7/34 | Beckman | 117—113 |
| 2,981,639 | 4/61 | Kachele | 117—113 |
| 3,060,057 | 10/62 | Johnson | 117—94 X |

RICHARD D. NEVIUS, *Primary Examiner.*

JOSEPH B. SPENCER, *Examiner.*